(12) United States Patent
Pedersen et al.

(10) Patent No.: US 6,993,332 B2
(45) Date of Patent: Jan. 31, 2006

(54) METHOD OF PERFORMING HANDOVER BY USING DIFFERENT HANDOVER PARAMETERS FOR DIFFERENT TRAFFIC AND USER CLASSES IN A COMMUNICATION NETWORK

(75) Inventors: Klaus Ingemann Pedersen, Aalborg (DK); Jeroen Wigard, Aalborg (DK); Preben Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/512,462

(22) PCT Filed: Jun. 5, 2002

(86) PCT No.: PCT/IB02/02007

§ 371 (c)(1),
(2), (4) Date: Oct. 26, 2004

(87) PCT Pub. No.: WO03/105516

PCT Pub. Date: Dec. 18, 2003

(65) Prior Publication Data

US 2005/0215254 A1    Sep. 29, 2005

(51) Int. Cl.
*H04Q 7/20* (2006.01)

(52) U.S. Cl. .................. 455/436; 455/432.3; 455/439; 455/442; 370/329; 370/330; 370/331

(58) Field of Classification Search ............. 455/436, 455/437, 538, 439, 440, 441, 442; 370/329, 370/330, 331, 332, 333, 334
See application file for complete search history.

(56) References Cited

U.S. PATENT DOCUMENTS 2,005 A * 3/1841 Shepherd et al. ........... 249/126

(Continued)

FOREIGN PATENT DOCUMENTS

EP    0 817 517 A1    1/1998

(Continued)

OTHER PUBLICATIONS

"*Introduction to 3G Mobile Communications*", Handovers, pp. 35-39, pp. 267-268, pp. 337-339.

(Continued)

*Primary Examiner*—Charles Appiah
*Assistant Examiner*—Khawar Iqbal
(74) *Attorney, Agent, or Firm*—Squire, Sanders & Dempsey LLP

(57) ABSTRACT

The present invention relates to a method for performing handover in a communication network, wherein communication with a subscriber terminal (UE) having subscribed to said network is performed by the intermediate of at least one network entity (Node B) handling the communication of said subscriber terminal, upon a change of a communication state for said subscriber terminal within said network, which fulfills a predetermined handover trigger condition, a handover procedure is performed under control of a control entity (RNC) of the communication network, a handover procedure is defined by a handover signaling scenario (HO, HHO, SHO, SSTD) and at least one set of handover parameters per signaling scenario, the handover parameters define a respective handover trigger condition, a communication with a subscriber terminal belongs to a specific one of a plurality of traffic classes, and wherein at least one user class is defined per traffic class, the method comprising the steps of configuring a set of handover parameters and a handover signaling scenario per user class, and performing, upon detection that said handover trigger condition is fulfilled, the handover procedure for said subscriber terminal as defined by the configured handover signaling scenario and the configured set of handover parameters for the respective user class of the respective traffic class.

9 Claims, 3 Drawing Sheets

HO Priorities per user class and traffic class
based on e.g. allocation/retention priority

| Traffic Class \ User Class | Gold | Silver | Bronze |
|---|---|---|---|
| Conversational | 1 | 2 | 5 |
| Streaming | 3 | 4 | 8 |
| Interactive | 6 | 7 | 9 |
| Background | 9 | 10 | 10 |

U.S. PATENT DOCUMENTS

| | | | |
|---|---|---|---|
| 5,497,504 | A | 3/1996 | Acampora et al. |
| 5,509,051 | A * | 4/1996 | Barnett et al. ............... 455/443 |
| 6,263,205 | B1 * | 7/2001 | Yamaura et al. ............ 455/442 |
| 6,269,087 | B1 * | 7/2001 | Nakamura et al. .......... 370/331 |
| 6,385,451 | B1 * | 5/2002 | Kalliokulju et al. ........ 455/436 |
| 6,453,176 | B1 * | 9/2002 | Lopes et al. ............. 455/562.1 |
| 6,477,373 | B1 * | 11/2002 | Rappaport et al. .......... 455/436 |
| 6,496,492 | B1 * | 12/2002 | Zeng .......................... 370/331 |
| 6,504,828 | B1 * | 1/2003 | Corbett ....................... 370/331 |
| 6,505,043 | B1 * | 1/2003 | Aihara ....................... 455/436 |
| 6,556,824 | B1 * | 4/2003 | Purnadi et al. ............. 455/442 |
| 6,556,834 | B1 * | 4/2003 | Kobayashi et al. ......... 455/464 |
| 6,587,445 | B1 * | 7/2003 | Mimura ...................... 370/331 |
| 6,708,030 | B1 * | 3/2004 | Horikawa ................... 455/436 |
| 6,810,252 | B1 * | 10/2004 | Kwon ........................ 455/436 |
| 6,810,259 | B1 * | 10/2004 | Zhang ..................... 455/456.5 |
| 6,845,238 | B1 * | 1/2005 | Muller ....................... 455/436 |
| 2001/0007819 | A1 * | 7/2001 | Kubota ....................... 455/439 |
| 2002/0090951 | A1 * | 7/2002 | Kanagawa .................. 455/446 |
| 2002/0181444 | A1 * | 12/2002 | Acampora .................. 370/352 |
| 2005/0075124 | A1 * | 4/2005 | Willenegger et al. ....... 455/522 |

FOREIGN PATENT DOCUMENTS

| | | | |
|---|---|---|---|
| EP | 0 920 230 A1 | | 6/1999 |
| EP | 0 981 254 A2 | | 2/2000 |
| JP | 2000-184424 | * | 6/2000 |
| JP | 2000-232671 | * | 8/2000 |
| JP | 2002-135823 | * | 5/2002 |
| WO | WO98/58515 | * | 12/1998 |
| WO | WO 00/54540 | | 9/2000 |

OTHER PUBLICATIONS

TSGR1#3(99)187, "*Improvements to Site Selection Diversity Transmission (SSDT)*", TSG-RAN Working Group 1 meeting#3, Mar. 22-26, 1999, pp. 1-6.

TSGSP#3(99)152, "*Universal Mobile Telecommunications Systems (UMTS); QoS Concept (UMTS 23.07 version 0.3.0)*", TSG-SA meeting #3, Apr. 26-28, 1999, pp. 1-23.

3GPP TR 25.922 V3.4.0, "*3$^{rd}$ Generation Partnership Project; Technical Specification Group Radio Access Network; Radio Resource Management Strategies*", Dec. 2000, pp. 1-67.

* cited by examiner

*HO Priorities per user class and traffic class based on e.g. allocation/retention priority*

| User Class / Traffic Class | Gold | Silver | Bronze |
|---|---|---|---|
| Conversational | 1 | 2 | 5 |
| Streaming | 3 | 4 | 8 |
| Interactive | 6 | 7 | 9 |
| Background | 9 | 10 | 10 |

FIG. 2

METHOD OF PERFORMING HANDOVER BY USING DIFFERENT HANDOVER PARAMETERS FOR DIFFERENT TRAFFIC AND USER CLASSES IN A COMMUNICATION NETWORK

FIELD OF THE INVENTION

The present invention relates to a method for performing handover in a communication network.

BACKGROUND OF THE INVENTION

Recently, communication networks have found considerable attention and are still increasingly spreading. One major aspect in modern communication network is mobility of users, i.e. a user of a subscriber terminal having subscribed to said network may move within the network or even to another network while still being able to continue an ongoing communication.

As will be apparent from the subsequent description of the present invention, the present invention is neither limited to a specific subscriber terminal type nor limited to a specific communication network type. For example, subscriber terminals such as mobile stations MS known from the GSM (Global System for Mobile Communication) communication system or so-called user equipments UE (corresponding to the MS) in the 3GPP ($3^{rd}$ Generation Partnership Project) UMTS (Universal Mobile Telecommunication System) communication system, or any other terminal type may be used in connection with the present invention, as long as the terminal's mobility within the network is supported. As to the network types, the GSM network or the 3GPP UMTS network or any other network may be used in connection with the preset invention as long as it supports the user terminals' mobility.

The subsequent description nevertheless focuses, by way of example only, to a UMTS communication network, which relies on WCDMA (Wideband Code Divisional Multiple Access).

In the UMTS communication system (as well as in the GSM system), the network is hierarchically constructed. Communication with a subscriber terminal UE having subscribed to said network is performed by the intermediate of at least one network entity known as Node_B in UMTS (or base station BS in GSM) handling the communication of said subscriber terminal. A mobile subscriber terminal moving and/or roaming within the network may be handed over to another such network entity. Such a handing over is generally referred to as handover. Assuming that the general construction of communication networks and also the basic principles of handover are familiar to the skilled readers, a further detailed description thereof is omitted here.

As mentioned before, the present invention is related to handover procedures as for example performed in wideband code division multiple access (WCDMA) systems such as the universal mobile telecommunication system (UMTS) or other communication systems. Such systems are traditionally designed to support soft-handover (SHO). SHO means that a user equipment (UE) might be connected to two or more Node_B's (base stations (BS)) when moving from one cell to another. A case in which a terminal is handed over from one Node_B to another one while being connected to only one Node_B (i.e. is connected to only a single base station or Node_B at a time during handover) is referred to as hard handover (HHO). In general, application of SHO makes it possible to have seamless (transparent) handover and improved coverage. However, the price paid for having SHO is a higher average transmit power level from Node_B's (and/or) BS's in the network, also known as the SHO overhead.

Soft Handover SHO is basically explained with reference to FIG. 1. The SHO overhead is in general a function of handover parameters Window_Add and Window_Drop. The importance of these two parameters can be explained as follows. When the pathloss difference, or generally the signal quality represented by e.g. signal power, measured from a UE towards two different Node_B's (BS's) is less than Window_Add, then the UE enters SHO mode. (Note that one of the measured BS's is the BS having the strongest pilot signal). Similarly, when the pathloss difference becomes larger than Window_Drop, the UE exits. SHO mode (see FIG. 1) after the lapse of a period T_tdrop (exit or removal concerns the measured BS only, so that here exit/removal means that the concerned BS is removed from the active set AS). When entering SHO, an additional Node_B is put to the active set AS, while when leaving SHO, a Node_B is removed from the active set AS and put (again) to the neighbor cell set NS. It is further to be noted that generally a received signal level difference is evaluated prior to taking a decision on a HO, i.e. apart from pathloss measurement also shadow fading measurement and the like can be taken as a basis for a HO decision.

More generally, handover parameters for said soft handover SHO comprise at least a first threshold, e.g. window_add, indicating addition of an intermediate network entity handling communication of said subscriber terminal, a second threshold, e.g. window_drop, indicating removal of an intermediate network entity handling communication of said subscriber terminal, and a timing condition, e.g. T_tdrop, triggering said removal in combination with said second threshold. Thus, the handover parameters define a respective handover trigger condition, and upon a change of a communication state (e.g. signal quality) for said subscriber terminal within said network, which fulfills a predetermined handover trigger condition, a handover procedure is performed under control of a control entity such as the RNC of the communication network.

Hence, these parameters do implicitly determine the percentage of users in SHO mode, and therefore also the degree of SHO overhead. Notice here that users in SHO mode typically create an additional transmission overhead in the network, i.e. increased signaling between centralized radio network controllers (RNC) and BS's. Radio network controllers RNC represent an example of a control entity of the communication network performing control of a handover procedure. (RNC in UMTS corresponds to BSC in GSM.)

Since the skilled reader is assumed to be familiar with the basic principles of handover and soft handover, a further detailed description thereof is omitted here. Nevertheless, the attention of the interested reader is drawn to a comprehensive introduction to these topics as given by Juha Korhonen in "Introduction to 3G mobile communications", chapter 2.5, "Handovers", page 35 to 39, chapter 9.5, "network planning in WCDMA", pages 267 and 268, and chapter 11.4.1, "Soft handover", page 337–339, for example.

Currently, in a WCDMA system, the SHO algorithm used is defined on a per cell basis. This approach is, however, not optimal from a quality of service (QoS) and capacity point of view for modern cellular systems since this strategy of using identical handover algorithms and parameters per cell leads to a high SHO overhead, which subsequently results in a potential capacity loss.

SUMMARY OF THE INVENTION

Consequently, it is an object of the present invention to provide an improved method for performing handover in a communication network.

According to the present invention, the above object is for example achieved by a method for performing handover in a communication network, wherein communication with a subscriber terminal having subscribed to said network is performed by the intermediate of at least one network entity handling the communication of said subscriber terminal, upon a change of a communication state for said subscriber terminal within said network, which fulfills a predetermined handover trigger condition, a handover procedure is performed under control of a control entity of the communication network, a handover procedure is defined by a handover signaling scenario and at least one set of handover parameters per signaling scenario, the handover parameters define a respective handover trigger condition, a communication with a subscriber terminal belongs to a specific one of a plurality of traffic classes, and wherein at least one user class is defined per traffic class, the method comprising the steps of configuring a set of handover parameters and a handover signaling scenario per user class, and performing, upon detection that said handover trigger condition is fulfilled, the handover procedure for said subscriber terminal as defined by the configured handover signaling scenario and the configured set of handover parameters for the respective user class of the respective traffic class.

According to favorable further developments

- a communication state is represented by a measured signal quality at the subscriber terminal of said at least one intermediate network entity handling the communication of said subscriber terminal,
- said communication state is represented by a received signal level difference measured at the subscriber terminal towards two respective intermediate network entities,
- said handover signaling scenarios comprise at least one of a hard handover, a soft handover, and a site selection diversity transmission,
- said handover parameters for said soft handover comprise at least a first threshold (window_add) indicating addition of an intermediate network entity handling communication of said subscriber terminal, a second threshold indicating removal of an intermediate network entity handling communication of said subscriber terminal, and a timing condition triggering said removal in combination with said second threshold,
- said traffic classes comprise at least a conversational, a streaming, an interactive and a background traffic class,
- said user classes are distinguishable according to the respective subscription profile defining a subscribed quality of service,
- the subscription profile is determined by at least those radio access bearer attributes which are common to all traffic classes as defined in 3GPP 23.107 V3.5.0 (2000-12),
- said subscription profile is determined based on allocation/retention priority.

By virtue of the present invention, basically the following advantages can be achieved due to the proposed alternative scheme with user specific handover settings:

- it provides a higher degree of freedom, which is of help for optimizing the overall network performance,
- it also result in lower complexity and less strict timing requirements for communication between Node_B's (BS's)
- it reduces the transmission overhead, as not all users need to use the same SHO procedure,
- reducing the transmission overhead is considered to be very attractive when migrating to the new decentralized IP-RAN network architecture where centralized components such as radio network controllers (RNC) are eliminated,
- it enables optimization the overall network performance,
- furthermore, it enables to effectively impose QoS (Quality of Service) discrimination between different user classes, by using different handover procedures/parameters for different user classes, (notice here that QoS discrimination between user classes (e.g. gold, silver, and bronze users) is one of the most important features for third generation wireless systems),
- network implementation of future advanced high speed data services may also become easier as we can simplify handover procedures for these users to obtain lower complexity implementations, (this is in particular the case for the HSDPA (high speed downlink packet access) concept),
- reduced SHO overhead, which results in higher network capacity
- easier to implement network support of advanced high speed data services using hybrid automatic retransmission requests (H-ARQ),
- more optimal use of the different characteristics of the different traffic classes,
- easier differentiation between different user classes.
- possibility of having trade-offs between link quality and network capacity.

BRIEF DESCRIPTION OF THE DRAWINGS

In the following, the present invention will be described in greater detail with reference to the accompanying drawings, in which FIG. 2 shows a table mapping various user classes per respective traffic class, and illustrates a respectively assigned handover priority per user class according to the present invention.

DETAILED DESCRIPTION OF THE EMBODIMENTS

The present invention will subsequently be described in detail with reference to the accompanying drawings. Basically, the present invention proposes a method for performing handover in a communication network. In such networks, communication with a subscriber terminal, e.g. UE, having subscribed to said network is performed by the intermediate of at least one network entity, e.g. Node_B, handling the communication of said subscriber terminal.

Upon a change of a communication state for said subscriber terminal within said network, which fulfills a predetermined handover trigger condition, a handover procedure is performed under control of a control entity, e.g. RNC, of the communication network.

Figure 1:
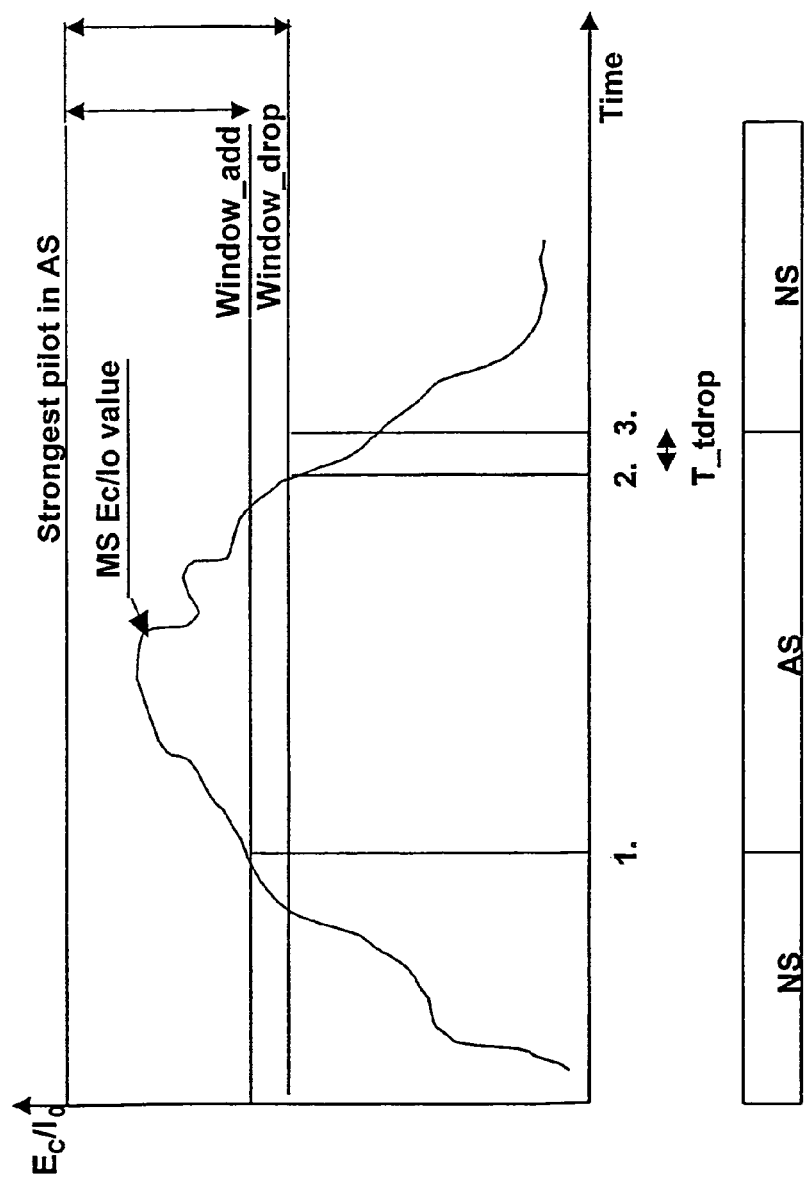
FIG. 1 shows an example of a characteristic of signal quality versus time for explaining a basic principle of Soft Handover SHO.

For example, a communication state is represented by a measured signal quality at the subscriber terminal of said at least one intermediate network entity, Node_B, handling the communication of said subscriber terminal. Said communication state may for example be represented by a pathloss difference and/or a received power difference (received signal level difference) measured at the subscriber terminal towards two respective intermediate network entities, which represents signal quality. With reference to FIG. 1, for example, the measured signal quality (pathloss) is represented by the ratio Ec/Io corresponding to the ratio RSCP/RSSI (Received Signal Code Power/Received Signal Strength Indicator). Nevertheless, any other quantity representative of signal quality could be used such as e.g. the bit error rate BER or the like.

A handover procedure is defined by a handover signaling scenario and at least one set of handover parameters per signaling scenario, the handover parameters defining a respective handover trigger condition. With reference to FIG. 1, a HO trigger condition is fulfilled if e.g. the measured signal quality exceeds a given value such that the difference towards the strongest pilot signal in the active set is less than window_add. Said handover signaling scenarios comprise at least one of a hard handover HHO, a soft handover SHO, and a site selection diversity transmission (SSDT) as a special case of a SHO.

A communication with a subscriber terminal belongs to a specific one of a plurality of traffic classes, and at least one user class is defined per traffic class. This means for example that four traffic classes known as conversational, streaming, interactive, and background are defined, and that for each such traffic class at least one user class is defined. Said user classes are distinguishable according to the respective subscription profile defining a subscribed quality of service QoS. The subscription profile can be determined by at least those radio access bearer attributes which are common to all traffic classes as defined in 3GPP 23.107 V3.5.0 (2000-12). For example, said subscription profile is determined based on allocation/retention priority.

Bearing the above in mind, it will be understood that the present invention comprises the steps of configuring a set of handover parameters and a handover signaling scenario per user class, and performing, upon detection that said handover trigger condition is fulfilled, the handover procedure for said subscriber terminal as defined by the configured handover signaling scenario and the configured set of handover parameters for the respective user class of the respective traffic class.

This will be explained in the following in greater detail. FIG. 2 shows a table mapping various user classes per respective traffic class, and illustrates a respectively assigned handover priority per user class according to the present invention. More precisely, the table shown in FIG. 2 comprises in the outer left column the traffic classes (conversational, streaming, interactive and background). In the uppermost row, respective user classes (gold, silver, bronze) are indicated as an example. More than three user classes may of course be defined, while also only one or two user classes could be defined per traffic class.

A user class is defined by the subscribed QoS profile for the users of this class. For example, "gold" class users have subscribed to the best available QoS in each traffic class, "silver" class user have subscribed to a lower QoS as compared to the "gold" class user, and the "bronze" class users have subscribed to the least good QoS profile as compared to "gold" and "silver" class respectively. The subscribed QoS will most probably be reflected in the charges that will be charged to the users. Stated in other words, "gold" class users will pay more per bit than "bronze" class users for using services the communication network offers.

In the thus defined matrix table of FIG. 2, the HO priorities are illustrated as a numerical value ranging from 1 to 10 per user class and traffic class. Thus, 10 HO priorities are assigned to 12 user class/traffic class constellations. As shown in FIG. 2, HO priorities 9 and 10 are assigned twice. However, this is a mere example and not binding for the present invention. For example, less than 10 HO priorities could be assigned to the 12 user class/traffic class constellations, so that e.g. more than two HO priorities would have to be reused, or at least one HO priority would have to be reused more than two times, or the like.

FIG. 2 indicates that the HO priorities are based on the allocation/retention priority as an example of radio access bearer attributes. However, this is an example only and in general, a subscription profile (QoS and/or user class) can be determined by at least those radio access bearer attributes which are common to all traffic classes as defined in 3GPP 23.107 V3.5.0 (2000-12). Also, it is possible to define the HO priorities based on more than one of those radio access bearer attributes. In such a case, the contribution of individual attributes to the (finally) defined HO priority would have to be weighted according to a preset weighting scheme to be defined by the network operator.

Returning to the specific example in FIG. 2, ten HO priorities are shown, one of which is allocated to a respective user class operating in a respective traffic class. Each HO priority signifies that a user of the concerned user class when communicating in a respective traffic class is treated in a specific manner as regards handover. For example, a Gold class user communicating in conversational class gets different "handover treatment" as compared to a silver class user having interactive communication. The different HO treatment of users is independent of the cells in which the user is currently present.

"Handover treatment" as mentioned above means a HO procedure to be applied per user class per traffic class, i.e. a gold conversational user experiences another handover as compared to a bronze streaming user.

This will be explained with reference to FIG. 3. As mentioned before, FIG. 3 represents a hierarchical structure of handover procedures which are distinguishable based on the HO signaling scenario and the respective parameter set of the scenario, according to the present invention, and to which is assigned a respective one of said HO priorities mentioned in FIG. 2.

The HO procedures are basically distinguishable according to their HO signaling scenario. Signaling scenarios are for example the hard handover HHO and the soft handover SHO. A special case of the SHO is SSDT. Apart therefrom, further HO signaling scenarios exist such as the "softer HO" which is not excluded from being included in the proposed method of the present invention.

Figure 3:
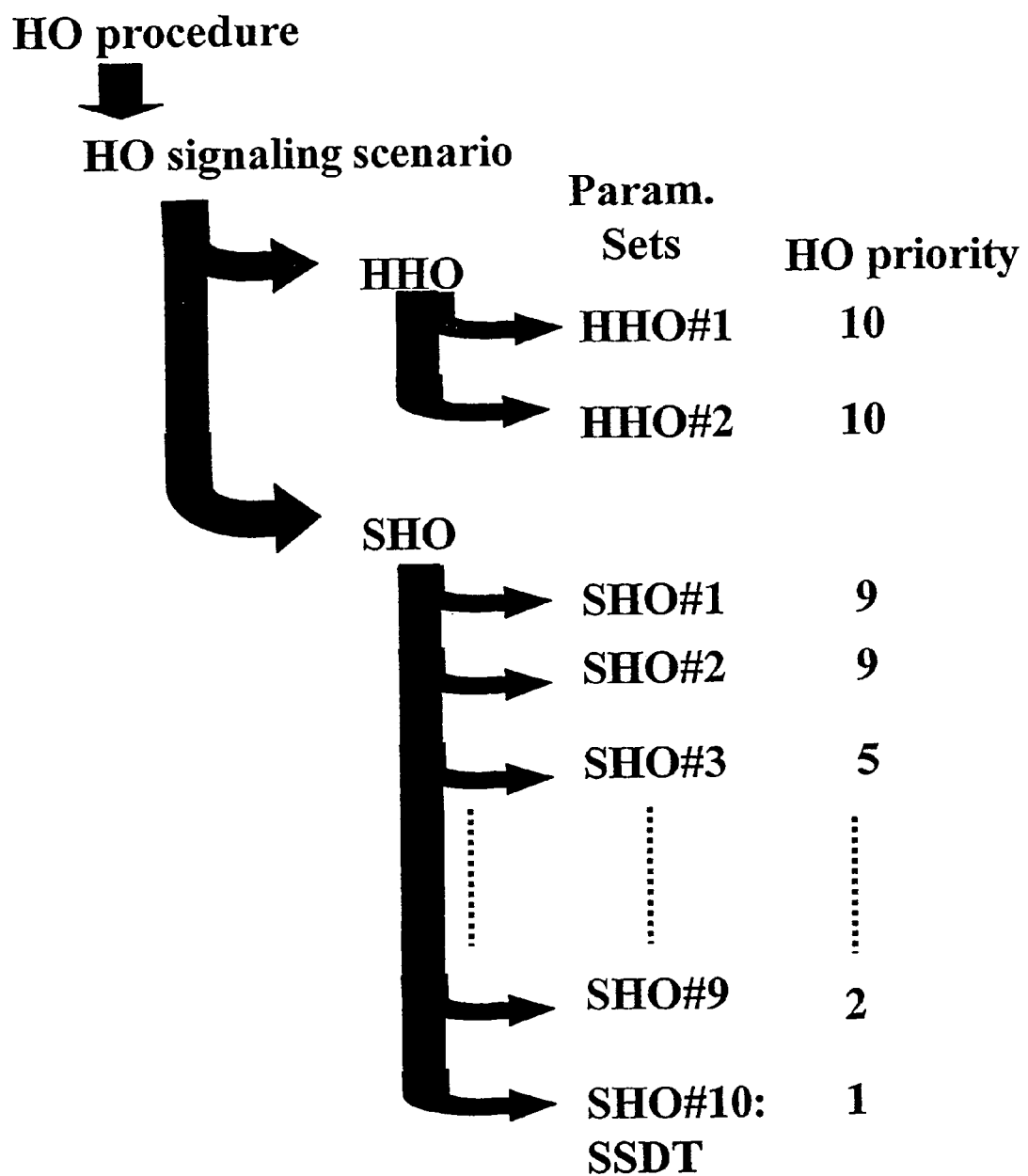
FIG. 3 represents a hierarchical structure of handover procedures which are distinguishable based on the HO signaling scenario and the respective parameter set of the scenario, according to the present invention, and to which is assigned a respective one of said HO priorities mentioned in FIG. 2.

Within each HO signaling scenario, at least one parameter set is defined, illustrated in FIG. 3 by HHO#1, HHO#2, SHO#L, ..., SHO#9, SHO#10:SSDT. Each parameter set may vary in at least one parameter as compared to another parameter set of the same HO signaling scenario. Also, as shown in FIG. 3, to each parameter set there is allocated a HO priority (indicated in FIG. 2).

Thus, with reference to the example of FIGS. 2 and 3, HO priority "10" is assigned to background traffic class for silver class as well as bronze class users. Thus, the respective parameter sets (which may be represented by HHO#1, HHO#2, respectively) do not differ from each other. Note, however, that in case background traffic for silver class users is assigned a higher/better priority (smaller number) as compared to the bronze class users, then also the parameter sets HHO#1, HHO#2 will differ from each other by at least one parameter in this example. Similar observations hold for interactive traffic of bronze class users and background traffic of gold class users. In the chosen example, these are allocated to SHO#1, SHO#2 parameter sets, respectively. Parameter set SHO#9 is allocated to HO priority 2 corresponding to conversational traffic for silver class users, while SHO#10:SSDT as assigned in the chosen example to the gold class users in conversational traffic class.

It should be noted that the illustrated mapping of HO priorities to parameter sets is arbitrarily chosen and that various other mappings could be chosen.

Also, even though it could be expected that gold class users have always the best HO priority in each traffic class, this need not necessarily be the case. For example, in background traffic class, all user classes could be assigned the same HO priority. Since user classes would then not be distinguishable from each other under this aspect for background traffic, this would then correspond to only one user class in the background traffic class.

Summarizing, according to the present invention there is proposed a new generic handover HO strategy, which can also be referred to as "user specific handover settings". The basic idea is to use different HO procedures (distinguishable by a HO signaling scenario in combination with respective HO parameters) for different user classes in the network. Doing this enables it to further optimize the network, and to thereby obtain a potential capacity gain. This makes it possible for the operator to make trade-offs between link quality (transparent HO) and network capacity (reduced SHO overhead).

The following options are for example suggested:

Use of the conventional SHO procedure (SHO signaling scenario) for all users in the system, but use different SHO parameters (e.g. window_add, window_drop and/or T_tdrop) for the different user classes. Hence some users might have a more or less large SHO margin (SHO marging meaning the difference between window_add and window_drop), while some users might use hard handover (HHO) (i.e., the SHO margin is set to be equal to zero). (If only one user class is defined per traffic class, then there are used different HO settings for e.g. realtime and non-realtime connections, i.e. different HO settings per traffic class.)

Some users might use conventional SHO algorithms with different parameter settings, while others are using SSDT (Site Selection Diversity Transmission) as a special mode of SHO. Notice here that SSDT as a form of power control for the downlink that can be applied while a terminal is in SHO is only is applicable for the downlink.

One possible example solution could therefore be to use SHO for all circuit switched real-time users (which need seamless HO), while packet switched users could use hard HO. Packet switched services typically consist of multiple packet calls with silent periods in between, which also are referred to as reading times. In order to minimize the loss in QoS for packet users, handovers could take place during these silent periods. The gain of the above strategy would also result in a lower SHO margin, which in the end lead to an overall capacity gain.

In addition, some of the new high speed data service features which are being proposed for UMTS set very strict requirements to the network architecture, when combined with SHO. Using the invention presented in the current report, one can chose to use hard HO for this type of users, while still using SHO for other users, and thereby make the implementation of advanced high speed data features easier.

Accordingly, as has been described herein above, the present invention relates to a method for performing handover in a communication network, wherein communication with a subscriber terminal (UE) having subscribed to said network is performed by the intermediate of at least one network entity (Node_B) handling the communication of said subscriber terminal, upon a change of a communication state for said subscriber terminal within said network, which fulfills a predetermined handover trigger condition, a handover procedure is performed under control of a control entity (RNC) of the communication network, a handover procedure is defined by a handover signaling scenario (HO, HHO, SHO, SSTD) and at least one set of handover parameters per signaling scenario, the handover parameters define a respective handover trigger condition, a communication with a subscriber terminal belongs to a specific one of a plurality of traffic classes, and wherein at least one user class is defined per traffic class, the method comprising the steps of configuring a set of handover parameters and a handover signaling scenario per user class, and performing, upon detection that said handover trigger condition is fulfilled, the handover procedure for said subscriber terminal as defined by the configured handover signaling scenario and the configured set of handover parameters for the respective user class of the respective traffic class.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method for performing handover in a communication network, wherein
communication with a subscriber terminal (UE) having subscribed to said network is performed by the intermediate of at least one network entity (Node_B) handling the communication of said subscriber terminal,
upon a change of a communication state for said subscriber terminal within said network, which fulfills a predetermined handover trigger condition, a handover procedure is performed under control of a control entity (RNC) of the communication network,
a handover procedure is defined by a handover signaling scenario (HO, HHO, SHO, SSTD) and at least one set of handover parameters per signaling scenario,
the handover parameters define a respective handover trigger condition,
a communication with a subscriber terminal belongs to a specific one of a plurality of traffic classes, and
wherein at least one user class is defined per traffic class, the method comprising the steps of
configuring a set of handover parameters and a handover signaling scenario per user class, and
performing, upon detection that said handover trigger condition is fulfilled, the handover procedure for said subscriber terminal as defined by the configured handover signaling scenario and the configured set of handover parameters for the respective user class of the respective traffic class.

2. A method according to claim 1, wherein a communication state is represented by a measured signal quality at the subscriber terminal of said at least one intermediate network entity (Node_B) handling the communication of said subscriber terminal.

3. A method according to claim 2, wherein said communication state is represented by a received signal level difference measured at the subscriber terminal towards two respective intermediate network entities.

4. A method according to claim 1, wherein said handover signaling scenarios comprise at least one of a hard handover (HHO), a soft handover (SHO), and a site selection diversity transmission (SSDT).

5. A method according to claim 4, wherein said handover parameters for said soft handover (SHO) comprise at least
 a first threshold (window_add) indicating addition of an intermediate network entity handling communication of said subscriber terminal,
 a second threshold (window_drop) indicating removal of an intermediate network entity handling communication of said subscriber terminal, and
 a timing condition (T_drop) triggering said removal in combination with said second threshold.

6. A method according to claim 1, wherein said traffic classes comprise at least a conversational, a streaming, an interactive and a background traffic class.

7. A method according to claim 1, wherein said user classes are distinguishable according to the respective subscription profile defining a subscribed quality of service.

8. A method according to claim 7, wherein the subscription profile is determined by at least those radio access bearer attributes which are common to all traffic classes as defined in 3GPP 23.107 V3.5.0 (2000-12).

9. A method according to claim 8, wherein said subscription profile is determined based on allocation/retention priority.

* * * * *